United States Patent
Noe

(10) Patent No.: US 6,707,541 B1
(45) Date of Patent: Mar. 16, 2004

(54) DEVICE AND METHOD FOR DETECTING POLARIZATION MODE DISPERSION

(75) Inventor: Reinhold Noe, Paderborn (DE)

(73) Assignee: Siemens Aktiengesellschaft (DE)

( * ) Notice: Subject to any disclaimer, the term of this patent is extended or adjusted under 35 U.S.C. 154(b) by 591 days.

(21) Appl. No.: 09/650,562

(22) Filed: Aug. 30, 2000

(30) Foreign Application Priority Data

Aug. 30, 1999 (DE) .......................................... 199 41 150

(51) Int. Cl.[7] .............................................. G01N 21/00
(52) U.S. Cl. ........................ 356/73.1; 385/11; 359/161; 359/156
(58) Field of Search ................................ 356/364, 73.1; 359/161, 173, 140, 156; 385/11, 24, 27, 28

(56) References Cited

U.S. PATENT DOCUMENTS 5,546,210 A * 8/1996 Chraplyvy et al. .......... 359/124
6,275,315 B1 * 8/2001 Park et al. ................... 359/153

* cited by examiner

*Primary Examiner*—Hoa Q. Pham
(74) *Attorney, Agent, or Firm*—Bell, Boyd & Lloyd LLC

(57) ABSTRACT

A method and apparatus for determining polarization dispersion of optical signals by measuring respective deviations between output signals that correspond to spectral power densities of the optical signal, and the output signals in undistorted conditions. The present method and apparatus uses output voltages from a plurality of filters in determining the polarization dispersion.

13 Claims, 5 Drawing Sheets

DEVICE AND METHOD FOR DETECTING POLARIZATION MODE DISPERSION

FIELD OF THE INVENTION

The present invention relates to a device and method for detecting polarization mode dispersion of an optical data signal.

DESCRIPTION OF RELATED ART

Long optical waveguide transmission links are used in optical transmission technology. Due to Production imperfections, these optical waveguide links are not completely isotropic, but rather weakly birefringent. Therefore, a long transmission link results in frequency-dependent polarization transformation—known as polarization mode dispersion or polarization dispersion, (PMD). Because of the change in the polarization of the optical signal as a function of the optical frequency and the different frequency-dependent delays, this PMD effect leads to the widening of transmitted pulses. This means that at the receiving end, the identifiability of said pulses is reduced and, as a result, the data rate that can be transmitted is limited.

This effect is further aggravated by the fact that the transmission response of the link and hence the PMD, change as a result of temperature variance or mechanical stress. Accordingly, adaptive PMD compensators are inserted in the transmission path. To drive these compensators, PMD distortions must be detected in the optical receiver. The compensator can then be set optimally, for example by using a gradient algorithm.

In Electronic Letters, Feb. 17, 1994, volume 30, No.4, pages 348 to 349, use is made of a bandpass filter for filtering a data signal whose PMD is to be detected. A power detector at the filter output supplies a signal which is higher, the smaller the PMD distortions are.

What is disadvantageous is that when a high degree of first-order PMD is present, this signal does not vary monotonically as a function of the differential group delay (DGD) and, therefore, clear signals cannot be obtained.

In Proceedings OEC 94, 14e-12, pages 258 to 259, Makuhari Trade Fair, Japan 1994, a different method is used, in which the power of the differential signal between decision-circuit output and decision-circuit input is evaluated. However, this signal has less sensitivity to PMD distortions than a suitable bandpass filter. Moreover, incorrect decisions may occur, particularly, in the event of severe PMD distortions, where the DGD exceeds the bit period. As such, the signal obtained is an unsuitable criterion for indicating the presence of the PMD distortions.

SUMMARY OF THE INVENTION

The object of the present invention is to specify a reliable detector even for relatively large values of the differential group delay. Furthermore, the present invention specifies a suitable arrangement for compensation of the polarization mode dispersion and the optimum setting of the detector.

The object is achieved by detecting polarization mode means of a device for dispersion including a filter(s) and a measuring device(s) that is connected to the output of the filter(s). The measuring device supplies output signals that correspond to the spectral power densities at various frequencies of the photodetected optical data. The respective deviation between these output signals that correspond to the spectral power densities and each of the output signals in the undistorted condition at different frequencies indicates the signal distortion.

The particular advantage of the invention is in the combination of output voltages of a plurality of filters. These voltages have a monotonic profile in are the principle ranges utilized, and particular high steepness, which is not available with the use of a single bandpass filter or a single low-pass filter. Accordingly, a significantly more accurate compensation is thus possible.

In other words, the use of bandpass filters has the advantage over the use of low-pass filters in that a higher steepness of the filter output voltages as a function of the differential group delay is achieved. As a result, even a more accurate/faster compensation can be carried out.

Instead of a plurality of bandpass filters/low-pass it is also possible to use switchable/controllable bandpass switchable/controllable low-pass filter.

The device for detecting polarization mode dispersion can be further supplemented by a criteria. Devices which evaluate intentionally produced—error rates of a data auxiliary signal obtained from the received optical signal are particularly advantageous in this case. A particularly simple circuit can be realized by means of a controllable sampling threshold in the evaluation of the data signal.

DETAILED DESCRIPTION OF THE PREFERRED EMBODIMENT

Exemplary embodiments of the invention are described with reference to figures.

Figure 1:
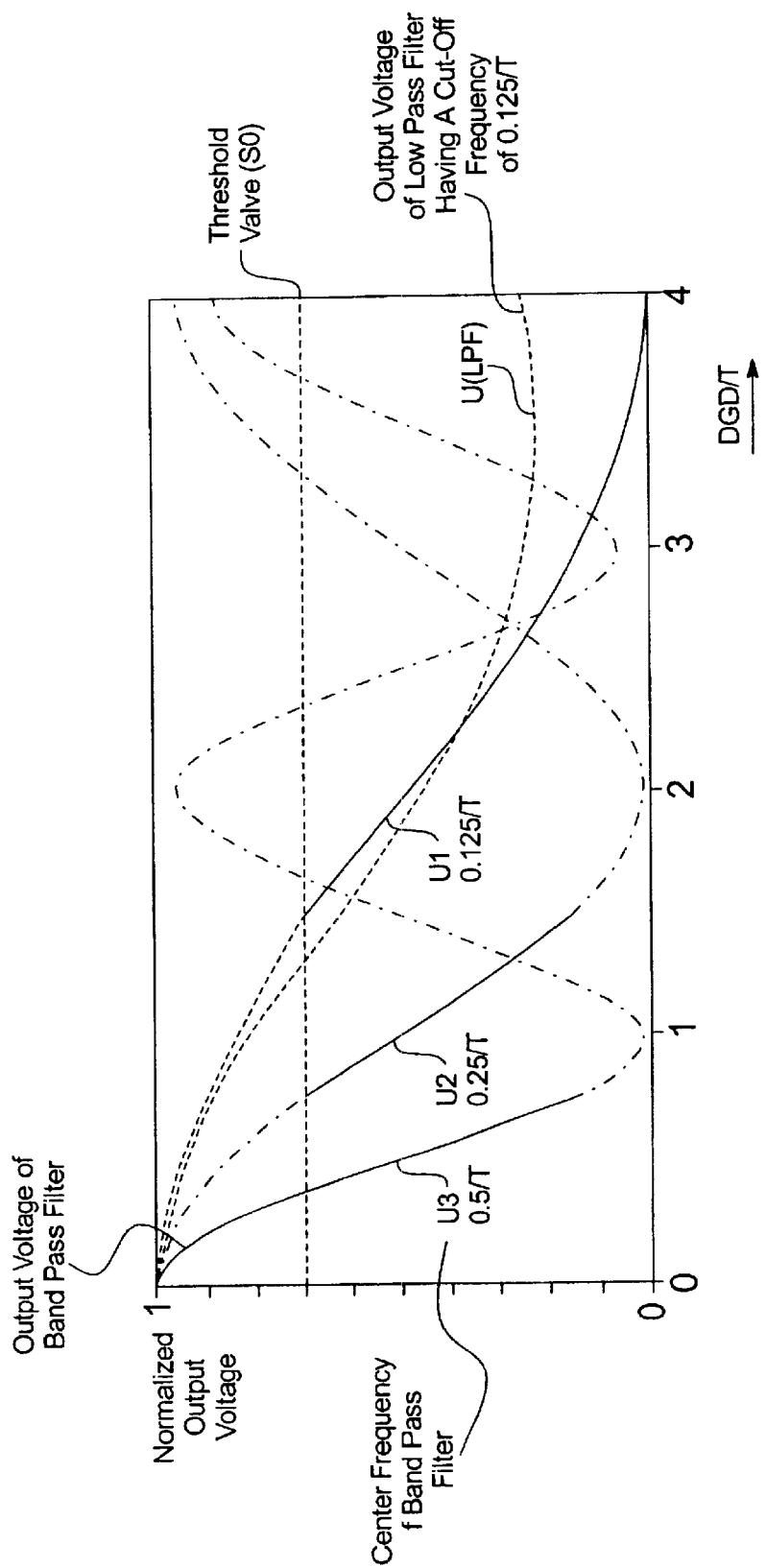
FIG. 1 shows the normalized profile of the filter output voltages.

FIG. 1 shows the standardized profile of the filter output voltages U1 to U3 of three bandpass filters whose center frequencies are 0.125/T, 0.25/T and 0.5/T, respectively, where T is the bit period of the transmitted data signal. Moreover, the output voltage U (LPF) of a low-pass filter having the cut-off frequency 0.125/T is plotted as a function of the standardized differential group delay DGD/T for the same level of excitation of both principle states of polarization. The term principal states of polarization, referred to as PSP below, designates those two states of polarization which are orthogonal to one another and in the event of whose excitation on the input side the corresponding output states of polarization to a first approximation do not change when the optical frequency changes. In polarization-maintaining optical waveguides, the principal states of polarization coincide with the principal axes, in other words are horizontal and vertical, In general, however, principal states of polarization are arbitrary orthogonal pairs of elliptic states of polarization. The principal states of polarization have different group delays, whose difference is referred to as differential group delay, DGD below. If an optical signal is transmitted with one principal state of polarization, then, to a first-order approximation, no pulse widening takes place. If it is transmitted with a polarization which, in the case of splitting according to the two principal states of polarization, corresponds to power components that are identical there, maximum pulse widening occurs because two pulses of identical strength, with delay differences equal to DGD, are superposed.

If the principal states of polarization change as a function of the optical frequency, then it is the case, however, that, when a principal state of polarization which corresponds to a specific frequency is used on the input side, the output state of polarization will nevertheless change as a function of the frequency, but only in a higher order than the first order. This is referred to as higher-order PMD. Higher-order PMD generally occurs, although first-order PMD is predominant due to its effects and must therefore be compensated preferentially.

As can be seen, the output signal U3 enables error-free detection of the PMD only up to a value of the DGD of 1T, because the slope of the function changes the sign for values between 1T and 2T. The same applies correspondingly to the output voltages of the other bandpass filters and, to a lesser extent, also to those of the low-pass filter.

Figure 2:
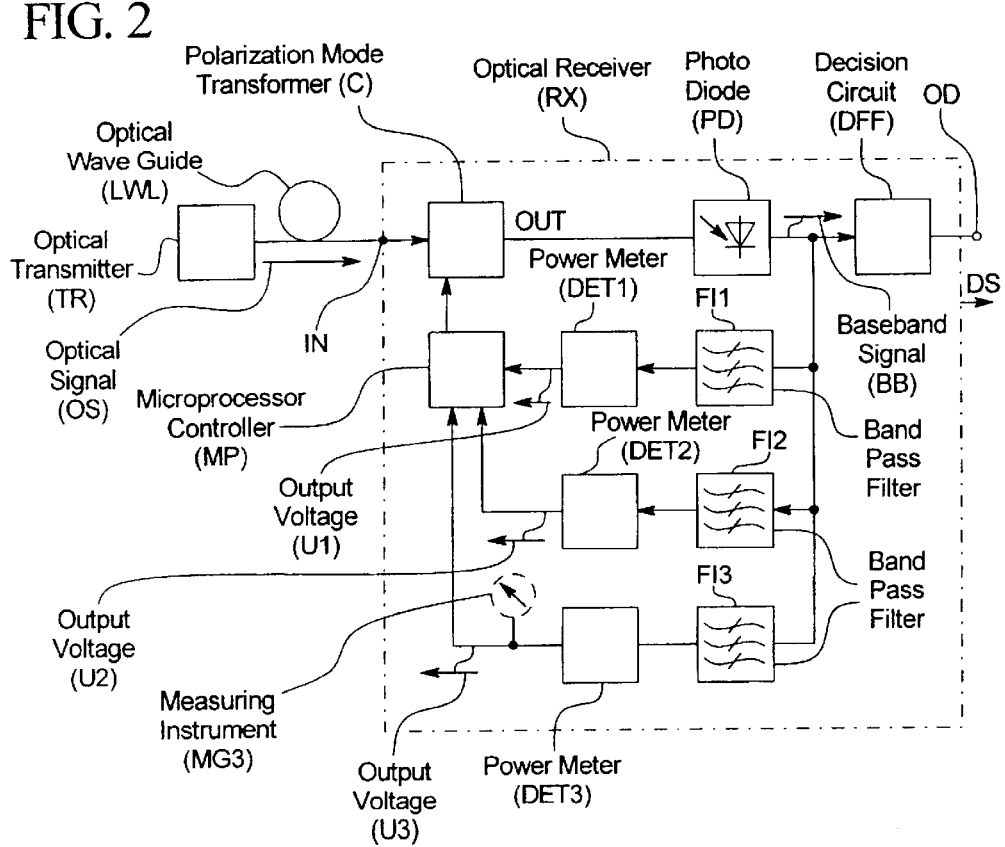
FIG. 2 shows an exemplary embodiment of the invention with three bandpass filters.

FIG. 2 illustrates the use of the device for detecting PMD in a compensator. An optical transmitter TR transmits an optical signal OS via an optical waveguide LWL to an optical receiver RX. The latter has a photodiode PD for converting the optical signal into an electrical signal. A decision circuit DFF connected downstream outputs the transmitted data signal DS at the output OD.

Connected upstream of the photodiode is a polarization mode transformer C for compensation of the polarization mode dispersion, whose input IN is identical to the receiver input.

The control criterion for the polarization mode transformer C is obtained from the baseband signal BB output by the photodiode. Said signal is fed to a plurality of filters F11 to F13, a power meters DET1 to DET3 being connected downstream of each of the outputs of the filters. Through smoothing capacitors or similar devices, these power meters also have a smoothing or low-pass filter function. The bandpass filters advantageously have center frequencies of 0.125/T, 0.25/T and 0.5/T, respectively. The bandpath are about 0.0001 to 0.2 times the respective center frequency.

Units such as amplifiers are not illustrated for reasons of clarity.

In order to clearly explain the setting of the compensator, it will be best to presuppose that a long differential group delay is initially present. Firstly, the output voltage U1 of the bandpass filter F11 (which is measured by the power meter) having the lowest center frequency 0.125/T is used by a microprocessor (with A/D and D/A converters), used as controller MP, for optimizing the compensator setting. As soon as this signal exceeds a threshold SO (upper threshold in the figure), the output signal of the bandpass filter F12 having the next higher center frequency 0.25/T is used for the optimization. If this also yields a high output signal which exceeds the threshold (or a different threshold chosen in accordance with the embodiment), the system switches to the bandpass filter having the highest center frequency 0.5/T. Although this has the smallest monotonicity range of the output signal, the concomitant assessment of the output signals of the other bandpass filters ensures that it yields output signals in the first monotonicity range of 0≦DGD≦T. Therefore, its high sensitivity can be utilized particularly advantageously for the compensation of the PMD distortions. The monotonicity ranges utilized are depicted in a continuous fashion as principal values in FIG. 1.

In order to achieve an optimum bit error rate, it is also possible to perform a nonlinear or linear combination of the bandpass filter output signals or the outputs signals of the power detectors connected downstream. Accordingly, the filter output signal which is selected as a function of the output signals of the lower-frequency bandpass filters is simply replaced by the output signal or signals of the lower-frequency signals, in that: if the output signal of DET1 has not exceeded its threshold, only this signal is used. If the threshold is exceeded, the output signal of DET2 is included as well. Finally, if the threshold of the latter is also exceeded, the output signal of DET3 is included.

For measurement purposes, measuring instruments can be connected directly to the outputs of the detectors DET1 to DET3. An example of such a dence is MG3 as illustrated in FIG. 2.

Figure 3:
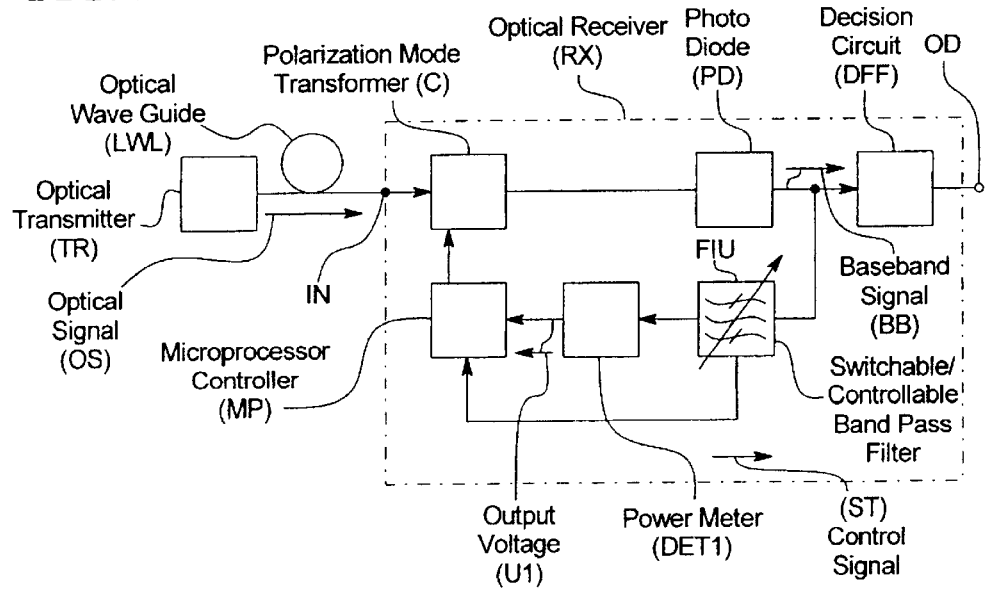
FIG. 3 shows a further exemplary embodiment with a controllable bandpass filter.

FIG. 3 illustrates a variant of the detection device, in which the three bandpass filters are replaced by a single switchable/controllable bandpass filter F1U. The procedure in the course of compensation remains the same. The microprocessor MP used as controller in each case remembers the preceding output voltages, so that assignment of the principal values (monotonicity ranges) of the filters having higher center frequencies is possible in a clear manner. The filter is set by a control signal ST.

Figure 4:
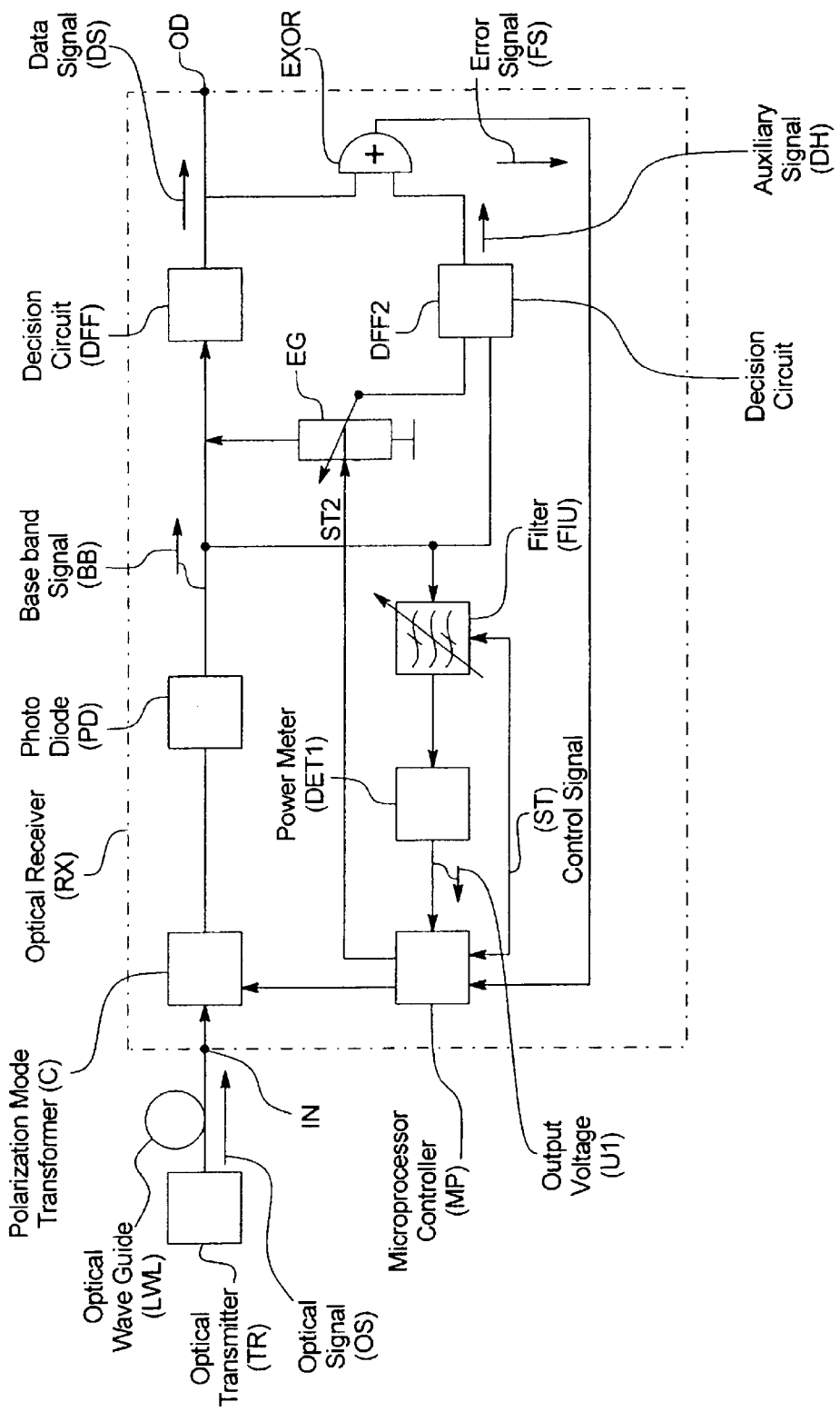
FIG. 4 shows a further exemplary embodiment with additional evaluation of a data auxiliary signal.

FIG. 4 illustrates a further embodiment according to the present invention, in which a second decision circuit DFF2 is used, to which the baseband signal BB is likewise fed. In this exemplary embodiment, the threshold of the decision circuit can be adjusted by means of a setting device EG until said decision circuit already yields an erroneous data auxiliary signal DH when the first decision circuit DFF still outputs an essentially error-free data signal DS. The output signals are compared with one another in an EXCLUSIVE-OR gate EXOR, and the error signal FS thus obtained is likewise used by the microprocessor MP for controlling the polarization mode transformer C. Shifting the threshold of the second decision circuit continuously develops a measure of how good the signal quality is with regard to an achievable bit error rate. The lower the error rate of the data auxiliary signal when the threshold is shifted from the optimum, the better the signal quality. A maximum output voltage of the switchable/controllable filter FIU and a minimum error rate will roughly correspond. By contrast, a more accurate assessment, leading to a lower bit error rate of the decision circuit DFF, results when the error signal FS is used. Since deviations of the data auxiliary signal DH from the data signal DS occur stochastically, however, a relatively long measuring or averaging time of the error signal FS is necessary in order to obtain a particularly good signal/noise ratio and hence optimum compensation. The additional information obtained with the aid of the second decision circuit is used to optimize the filter FIU, that is to say to vary its transfer function. This adaptive form of operation apparently makes the manufacturing defects, temperature fluctuations, occurrence of nonlinear effects, etc. tolerable. The major advantage of these embodiments is that fast compensation is already possible by means of the filter output signal and there is sufficient time available for the fine setting and the setting of the transfer function of the filter.

However, particularly in cases in which fast setting of the polarization mode transformer C is not important, it is also possible to use only an error signal FS, so that in FIG. 4 the filter FIU and the power detector DET1 could be omitted.

Figure 5:
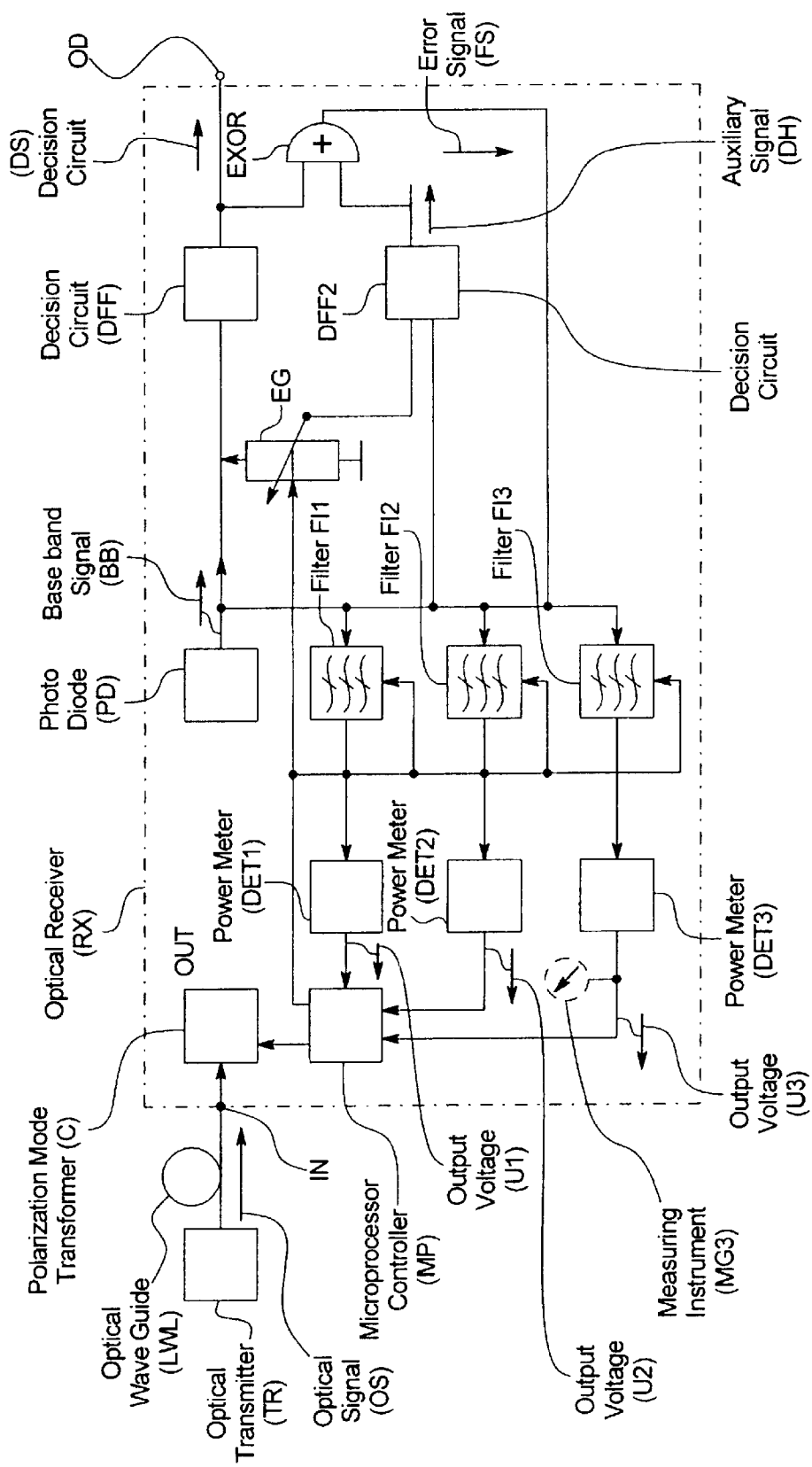
FIG. 5 shows a further variant of this exemplary embodiment.

When a plurality of bandpass filters are used, as illustrated in FIG. 5, the transfer functions of the filters or the weightings of the individual filter output signals can be varied in such a way that the smallest PMD distortions occur. Since this can be done slowly, whereas the filter output signals and their combination are quickly available, the same advantages as in the exemplary embodiment of FIG. 4 result from this adaptive form of operation.

In principle, the polarization mode transformer can also be controlled by the error signal.

It is favorable for the bandpass filters to have a low time/bandwidth product, that is to say the product of duration of the impulse response times the bandwidth in the frequency range. Bessel filters, for example, are suitable for this purpose.

In principle, any desired rectifiers such as e.g. biased semiconductor Schottky diodes can be used for the power measurement downstream of the bandpass filters. However, it is particularly expedient to give these rectifiers or power meters an as far as possible quadratic directional characteristic, so that a signal which is proportional to the power is actually measured, and not a signal which is proportional to a different power than 2 of the magnitude of the input amplitude. In the case of the known Schottky diodes, this is fulfilled particularly well when an as far as possible level-independent index can be specified in mV/mW, that is to say mV rectified voltage per mW input power. Power meters with diodes can be implemented in single-ended operation or in push-pull operation, can apply a bias current to the diode(s) and, moreover, may have temperature compensation by subtraction of the forward voltage of one is or in push-pull operation two—diodes not used for the power measurement.

Four-quadrant multipliers such as e.g. the known Gilbert cell multipliers, whose two inputs are driven by the same signal, are also highly suitable for squaring.

The previous exemplary embodiments specified an evaluation method by means of linear combinations of the measured powers at the outputs of the different filters, if appropriate supplemented by adaptive variation or switching of weights; this method is not the only possible method for evaluating such signals. In a further exemplary embodiment of the invention, in particular differences between the spectral power components at different frequencies are detected, thereby identifying distortions of the power density spectrum. This is because great fluctuations in the spectral power density at adjacent frequencies generally have a highly adverse effect on the eye pattern, which determines the bit error rate.

Let the output powers of the bandpass filters be U1, U2, U3, ... Un, where the index n refers to the filter having the highest center frequency and the index 1 refers to the filter having the lowest center frequency. A suitable linear combination, corresponding to the evaluation of filter output powers mentioned above, is $T1.=a_1*U1+a_2*U2+...+an*Un$, where ai (i=1, 2... n) are generally non-negative weights.

However, a term which reacts particularly strongly to differences between the output powers of frequency-adjacent filters is $T2=-(|b_1*U_1-c_1* U_2|^m+|b_2*U_2-c2* U_3|^m+...+|b(n-1)*U(n-1)-c(n-1)*U_n|^m)$, where bi, ci are once again non-negative weights and m is an exponent greater than 1. The weights bi, ci are chosen such that at least approximately T2=0 in the undistorted case (without PMD). In the simplest case, e.g. all weights ai=bi=ci=1 are equal to one. A suitable exponent is m=2, but higher values such as 3 or 4 are also suitable. The term T2 or the sum T1+T2 decreases relative to the achievable maximum value in the presence of PMD to a much greater extent than would be the case e.g. with the term T1 alone. In the case of m=2, the sum T1+T2 is a quadratic form which can be calculated with little computation complexity e.g. in a microprocessor. Instead of in the form shown, the term T2 could also be calculated in another way, provided that it assesses only abrupt differences between the spectral power density at adjacent frequencies as particularly unfavorable. The evaluation of the filter output powers can also be performed by neural networks or fuzzy logic.

Figure 6:
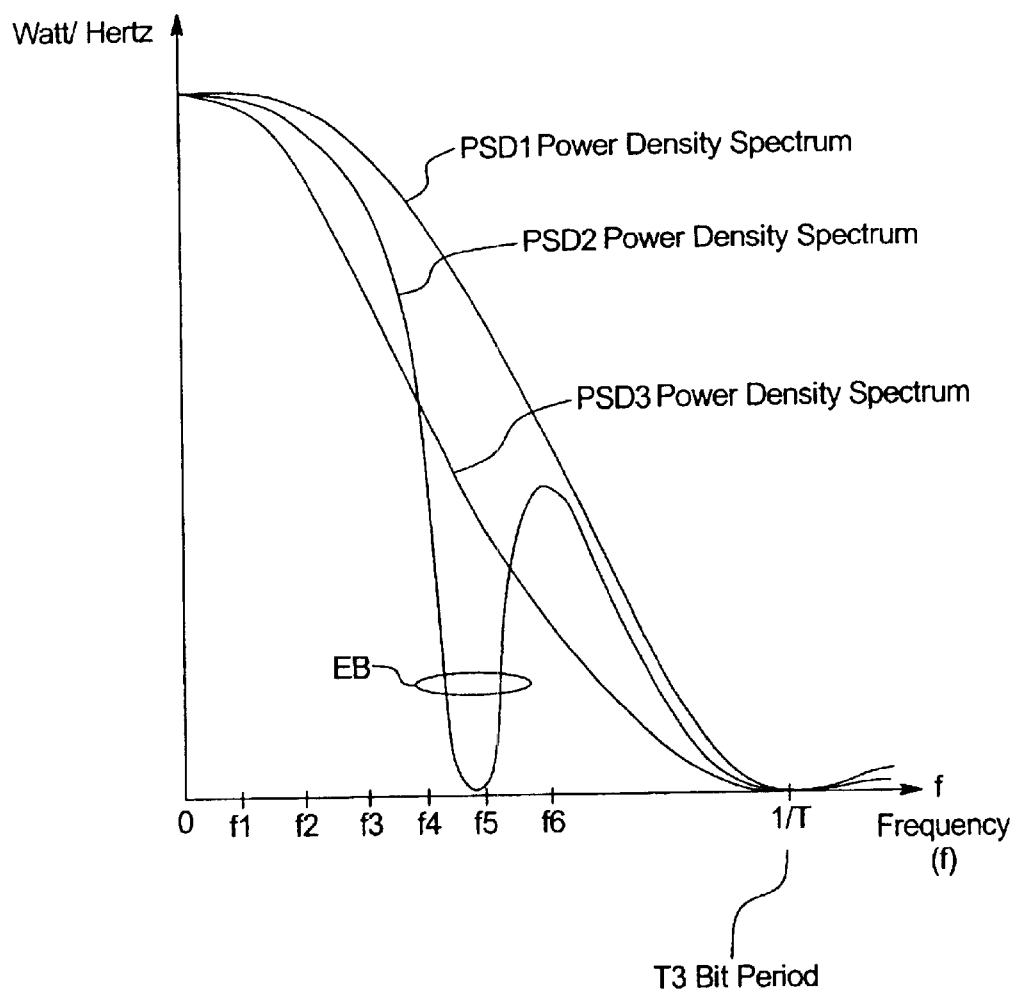
FIG. 6 shows power density spectra with and without PMD distortions.

FIG. 6 shows various power density spectra of the received data signal as a function of the frequency f in the range between the frequency 0 and the bit repetition frequency 1/T, where T shall be the bit period. The power density spectrum PSD1 corresponds to that of an undistorted nonreturn-to-zero signal (NRZ). The power density spectrum PSD2 may be produced when PMD distortions are present, as may the power density spectrum PSD3. Since PSD2 and PSD3 have approximately the same areas, an evaluation of filter output signals only by means of a linear combination T1, given a typical choice of the coefficients ai, will regard these two spectra PSD2 and PSD3 as approximately equally good or poor. However, the severe dip EB in the power density spectrum PSD2 signifies de facto a severe impairment of the eye pattern. When the power density spectra PSD2 and PSD3 are assessed by means of the term T2, however, PSD3 will be correctly assessed as being better than PSD2. In this exemplary embodiment, by way of example, let there be 6 filters provided, whose center frequencies f1, f2, ..., fn where n=6 are 10, 20, ..., 60% of the bit timing frequency 1/T, and let m=4. The terms $-|b4*U4-c4*U5|^4$ and $-|b5*U5-c5*U6|^4$ yield a strongly negative contribution in the case of the power density spectrum PSD2 and a weakly negative contribution in the case of the power density spectrum PSD3, so that the desired classification is effected correctly according to the invention.

The coefficients ai, bi, ci and m can also be matched adaptively if a second decision circuit DFF2 is present, which can classify the signal quality using a bit error rate with the aid of an EXOR gate EXOR as shown in FIG. 4.

What is claimed is:

1. A device for detecting polarization mode dispersion of an optical data signal, comprising:

at least one filter;

at least one measuring device, said at least one measuring device being connected to an output of said at least one filter, said at least one measuring device supplies at least one respective output signal;

said at least one respective output signal corresponding to spectral power densities for various frequencies of the optical data signal, said optical signal being photodetected;

at least one respective output signal in an undistorted condition for each one of the at least one respective output signal, wherein a deviation between the said at least one respective output signal in an undistorted condition and said at least one respective output signal, at corresponding frequencies indicate distortions for said optical data signal.

2. device according to claim 1, wherein:

said corresponding frequencies are adjacent frequencies.

3. A device according to claim 1, wherein;

magnitudes of deviations are being raised to a power m, said magnitudes are being summed after being raised to the power m, said deviations comprising at least one said deviation, m>1.

4. A device according to claim 3, wherein m=2.

5. A device according to claim 1, wherein said measuring device forms an output signal, said output signal being proportional to a square of an input amplitude.

6. A device according to claim 5, wherein a linear combination of output signals is being formed, said output signals comprising at least one said output signal.

7. A device according to claim 1, wherein said measuring device is a power meter.

8. A method for detecting polarization mode dispersion of an optical data signal, comprising the steps of:

supplying at least one respective output signal by at least one measuring device, said at least one measuring device being connected to an output of at least one filter, said at least one output signal corresponding to spectral power densities for various frequencies of a photo detected optical data signal;

indicating signal distortions for said optical data signal based on a deviation between at least one respective output signal in an undistorted condition from said at least one respective output signal, at corresponding frequencies.

9. A method according to claim 8, wherein said indicating step is performed at adjacent frequencies.

10. A method according to claim 8, further comprising the step of:

raising magnitudes of deviations to a power m;

summing said magnitudes after being raised to the power m, said deviations comprising at least one said deviation, m>1.

11. A method according to claim 10, wherein m=2.

12. A method according to claim 8, further comprising:

measuring a power of said output signal via a measuring device having quadratic characteristics.

13. A method according to claim 8, further comprising the step of:

forming a linear combination of output signals, said output signals comprising at least one said output signal.

* * * * *